(12) United States Patent
Lin

(10) Patent No.: US 7,362,963 B2
(45) Date of Patent: Apr. 22, 2008

(54) MULTIMEDIA PHOTO ALBUMS

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1132 days.

(21) Appl. No.: 10/149,854

(22) PCT Filed: Dec. 14, 2000

(86) PCT No.: PCT/US00/33778

§ 371 (c)(1),
(2), (4) Date: Nov. 7, 2002

(87) PCT Pub. No.: WO01/45102

PCT Pub. Date: Jun. 21, 2001

(65) Prior Publication Data

US 2003/0052897 A1 Mar. 20, 2003

Related U.S. Application Data

(60) Provisional application No. 60/170,694, filed on Dec. 14, 1999.

(51) Int. Cl.
H04N 5/00 (2006.01)
H04N 5/91 (2006.01)
(52) U.S. Cl. .................. 386/125; 386/95; 386/126
(58) Field of Classification Search .............. 386/95, 386/106, 46, 111–112, 125–126, 120, 105, 386/124
See application file for complete search history.

(56) References Cited

U.S. PATENT DOCUMENTS 5,949,955 A * 9/1999 Nakai .................. 386/106
6,111,586 A 8/2000 Ikeda et al. .............. 345/433
6,154,600 A 11/2000 Newman et al. .......... 386/4
6,353,702 B1 * 3/2002 Ando et al. .............. 386/95

FOREIGN PATENT DOCUMENTS

| EP | 797 200 A2 | 9/1997 |
| EP | 942 609 A2 | 9/1999 |
| EP | 967 605 A1 | 12/1999 |
| EP | 971 535 A2 | 1/2000 |
| EP | 1041565 A1 | 10/2000 |
| EP | 1041566 A1 | 10/2000 |

OTHER PUBLICATIONS

Search Report.

* cited by examiner

Primary Examiner—Thai Q. Tran
Assistant Examiner—Tat Chi Chio
(74) Attorney, Agent, or Firm—Joseph J. Laks; Robert B. Levy; Jorge Tony Villabon

(57) ABSTRACT

A method and system for providing a disc media photo album having a physical data structure including a video title set, a video object set for title containing at least one video object and a plurality of cells is provided in which the disc media is backward compatible. The physical data structure can include at least one picture unit for each cell. Each picture unit can have at least one video object unit containing a photo album picture to be displayed. Moreover, each picture unit can include additional multimedia data such as audio, video or subpicture information to be displayed with the photo album picture. In addition, a plurality of menus can be embedded within the data structure to permit direct user access to individual photo album pictures through the menus.

34 Claims, 5 Drawing Sheets

MULTIMEDIA PHOTO ALBUMS

This application claims the benefit under 35 U.S.C. § 365 of International Application PCT/US00/33778, filed Dec. 14, 2000, which claims the benefit of U.S. Provisional Application, Ser. No. 60/170,694, filed Dec. 14, 1999.

BACKGROUND OF THE INVENTION

1. Technical Field

This invention relates generally to methods and apparatus for using a disc medium, for example a digital video disc (DVD), as an electronic album for photographs.

2. Description of the Related Art

Various devices have been developed to enable consumers to record video and audio programs for later presentation. Such devices include tape recorders, video cassette recorders, recordable compact disks, and most recently, recordable digital video discs (DVD). A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded, that is overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technology. Reference herein to rewritable DVD technology, devices and methods is generally intended to encompass all of the standards which are now being used, as well as those which may be developed in the future.

Typically, a DVD disc is used to store video such as movies or recorded television programs. Nevertheless, such a disc can also be used to digitally store a succession of high resolution photographs, thus defining a DVD photo album. Although desirable, implementing such a feature can be problematic. Specifically, current DVD specifications make it impossible to locate and access an individual picture. Moreover, any changes to the specification to overcome the accessibility issue can create compatibility problems with preexisting DVD players and can lead to increased manufacturing costs.

SUMMARY OF THE INVENTION

The invention features a method and system for providing a disc media photo album having a physical data structure including a video title set, a video object set (VOBS) for title containing at least one video object (VOB), and a plurality of cells, which disc media is backward compatible with DVD-video format. In one arrangement, the invention can include the steps of: providing at least one picture unit (PU) for each cell, in which each PU includes at least one video object unit (VOBU) containing a photo album picture to be displayed; and providing a plurality of menus embedded within the physical data structure to permit direct user access to individual photo album pictures through the menus.

In another arrangement, the invention features a recordable disc medium system for providing a disc media photo album. Under this arrangement, the invention can include: a disc medium recorder for recording the disc media photo album; a disc medium for storing the disc media photo album in which the disc medium can be backward compatible with DVD-video format and can have a physical data structure including a video title set, a video object set (VOBS) for title containing at least one video object (VOB) and a plurality of cells; at least one picture unit (PU) for each cell in which each PU can have at least one video object unit (VOBU) containing a photo album picture to be displayed; and a plurality of menus embedded within the physical data structure to permit direct user access to individual photo album pictures through the menus.

In the above method and system, the plurality of menus can include a menu for picture group for selecting at least one cell within each VOB. In another variation of the above method and system, the plurality of menus can also include a menu for picture set for selecting at least one PU within each cell. Moreover, the menu for picture group and menu for picture set can be contained within a VOBS for menu of the video title set. Further, the menu for picture group can be contained within the VOBS for title, and the menu for picture set can be contained within each VOB containing at least one of the picture units.

In another variation of the above method and system, the PU can be further comprised of video data to be displayed with the photo album picture. In addition, the PU can be further comprised of audio data to be displayed with the photo album picture. In another arrangement of the above method and system, the PU can be further comprised of subtitle information to be displayed with the photo album picture. Moreover, in the above method and system, a photo album directory can be added to a root directory of the disc media.

In another variation of the above method and system, a navigation pack for PU is provided in each VOBU for a photo album picture to be displayed in which the navigation pack can define control data for the photo album picture of the PU. The control data can include the following: a picture display time parameter to control a display duration for the photo album picture; an associated audio sound track enable control to control the playback of an audio sound track for the photo album picture; a slide show display time parameter for controlling a display time for each photo album picture in a slide show presentation; an associated video enable control for displaying a video presentation in coordination with the photo album picture to be displayed; a video display format control for selecting a format of the video presentation to be displayed in conjunction with the photo album picture; and PU address information for locating past and future PU's contained on the disc media.

In another arrangement, the invention can also feature a recordable disc medium for storing at least one photo album picture in which the disc medium can be backward compatible with DVD-video format. The disc medium can include: a physical data structure having a video title set, a video object set (VOBS) for title containing at least one video object (VOB) and a plurality of cells; at least one picture unit (PU) for each cell in which each PU can have at least one video object unit (VOBU) containing the photo album picture to be displayed; and a plurality of menus embedded within the physical data structure to permit direct user access to individual photo album pictures through the menus.

RECORDABLE DVD DEVICE

Figure 1:
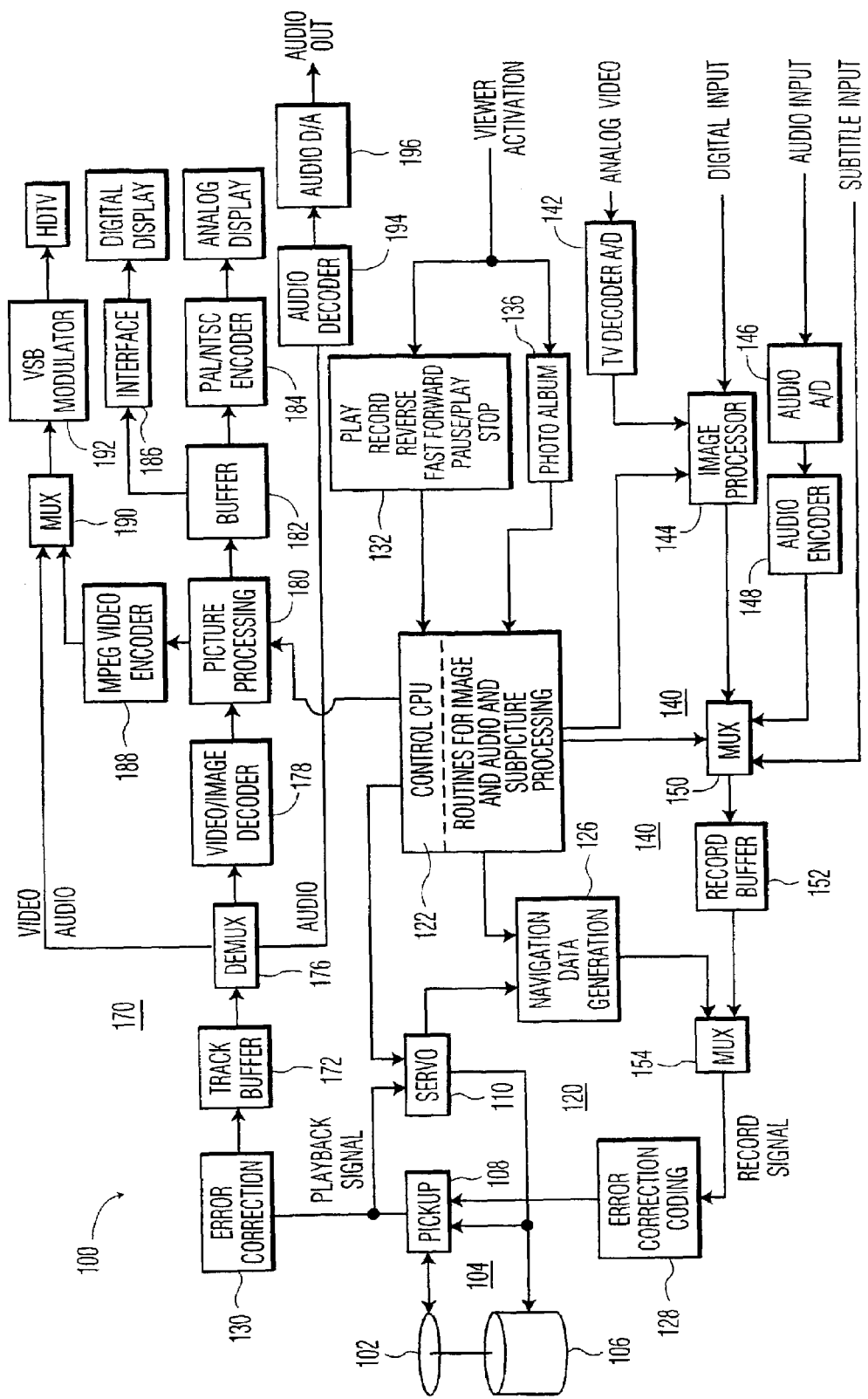
FIG. 1 is a block diagram of a rewritable DVD device capable of writing and reading photo album pictures in accordance with the inventive arrangements.

A device 100 for implementing the various advanced operating features in accordance with the inventive arrangements is shown in block diagram form in FIG. 1. A rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the disc 102 and a pickup assembly 108 that is adapted to be moved over the disc 102 as it spins. A laser on the pickup assembly 108 burns spots onto a spiral track on the disc 102 or illuminates spots already burned onto the track for recording and playing back photo album pictures, video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup assembly 108 and the motor 106 are controlled by a servo 110. The servo 110 also receives the Playback Signal of data read from the spiral track of the disc 102 as a first input. The Playback Signal is also an input to an error correction circuit 130, which can be considered part of the control section 120 or part of the video/audio output processing path 170.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo 110 can also be considered part of the control section 120. The navigation data generation circuit 126 supplies a first input signal to the multiplexer (MUX) 154, which forms part of the video/audio input processing path 140. The navigation data generation circuit 126 will generate navigation packet data to be stored on the disc 102 with the multimedia data.

The output of the MUX 154 is an input to an error correction coding circuit 128. The output of the error correction coding circuit 128 is a recordable input signal supplied to the pickup assembly 108, which will be "burned" onto the spiral track of the disc 102 by the laser.

A control buffer 132 for viewer activatable functions indicates those functions presently available, namely play, record, reverse, fast forward, slow play, pause/play and stop. The pause is a counterpart to pause operation in a VCR, for example manually interrupting the play back of a prerecorded program or interrupting the recording of a viewed program to eliminate commercials from the recording. A special function, labeled Photo Album, is illustrated as part of a separate buffer 136 to emphasize this aspect of the inventive arrangements. The control CPU 122 is also noted as having special routines for image, audio and subpicture processing to implement the DVD photo album, as will be later described in detail.

The video/audio input processing path 140 is a signal processing circuit for receiving multimedia data to be stored on the disc 102. One of the inputs can receive analog video signals, such as NTSC or PAL, from which a still picture may be selected to be stored as part of a photo album on the disc 102. Under this arrangement, a TV decoder 142 can receive and decode an analog video signal. The decoder 142 can also convert the analog video signal to a digital signal. The digitized signal can then be transferred to an image processor 144. Pictures that are selected from the signal can then be encoded by the image processor 144. In addition, the image processor 144 can increase the picture quality of the selected still images selected upon command of the control CPU 122. The still images are then sent to the MUX 150 for further processing.

The analog video input can also receive analog video signals to be combined with one or more still images recorded on the disc 102. Under this feature, the device 100 can record a portion of video and can combine the video with a stored picture. In addition, the video can be displayed as the still image is displayed. In one arrangement, the video can be displayed as a full image thereby blanketing the still picture. Alternatively, the video can be displayed under a picture-in-picture format in which the video is displayed in a box having smaller dimensions than that of the still image display.

Similar to the process in which still images are selected from an analog video signal, analog video that is to be combined with one or more still images is received, decoded and digitized by the decoder 142. The video can then be encoded and, if desired, enhanced by the image processor 144. The signal is then sent to the MUX 150 for further processing.

In addition to analog signals, the input processing path 140 can contain an input for receiving digital images. As an example, the digital input can receive photographs that have been scanned and digitized. Similar to the still images extracted from the analog signal, one or more of these digital images can be combined with a portion of video. The digital image can be received by the image processor 144. The image processor 144 can then determine whether the format of the digital image is compatible for purposes of storage on the disc 102. If the format is acceptable, the image processor 144 can enhance the digital image and can transfer the image to the MUX 150. If the format is not compatible, then the image processor 144 can convert the image to a format that can be stored on the disc 102 such as MPEG-1, MPEG-2 or JPEG. It should be noted, however, that the invention is not limited in this regard, as any other suitable format may be used to store still images on the disc 102. After a successful conversion, the image can be enhanced and sent to the MUX 150.

It should be noted that the device 100 is preferably capable of receiving, writing and reading still images of any size or resolution. For example, the device 100 can store still images that have been extracted from a high-resolution display such as an HDTV display. In addition, the chrominance resolution of the still images can be 4:2:0, 4:2:2 or 4:4:4; however, the invention is not so limited, as the device 100 can accept any type of chrominance resolution.

In addition to combining video with one or more still images, the device 100 can also add portions of an audio signal and subtitle information to one or more pictures comprising a DVD photo album. Conventional methods for achieving this result are well known in the art. Incoming audio can be converted to a digital signal by the audio A/D 146, encoded by audio encoder 148 and transferred to the MUX 150. In contrast, subtitle information can be directly fed in to the MUX 150. Once received, the audio or subtitle information can be multiplexed with one or more still images in the MUX 150. As a result, portions of video, audio or subtitle information can individually be combined with one or more pictures of a DVD photo album. Moreover, any combination of the foregoing multimedia data can be combined with one or more still images.

In one arrangement of the present invention, each still image can be given a picture name. This name can be generated by the user through the photo album buffer 136 and the control CPU 122 or, alternatively, the control CPU 122 can create a default name. Each name can be combined with its associated still image in the MUX 150. As will be explained later, these names can be used to locate and access individual pictures stored on the disc 102 through a plurality of menus in the data structure of the disc 102.

As the multimedia data is created, it can be temporarily stored in a record buffer 152 and then sent to the MUX 154. In the MUX 154, the data can be combined with appropriate navigation packets generated in the navigation data generation block 126. The data can then be sent to the error correction coding circuit 128. The error correction coding circuit 128 can also be deemed to be part of the input path 140.

The output processing path 170 can comprise an error correction block 130 and a track buffer 172, in which data read from the disc 102 can be temporarily stored for further processing. The data can then be sent to a DEMUX 176 where one or more components of the data can be separated. If the data is to be displayed under an analog or digital format, the audio component can be separated from the subtitle information, the still picture and any video that may have been combined with the picture.

The audio component can be directed to an audio decoder 194 where it can be decoded and then to an audio D/A 196 where it can be converted back to an analog signal. Additionally, the subtitle information, the still images and any associated video can be sent to a video/image decoder 178 where they can be decoded. Once decoded, this data can be sent to a picture processor 180. A number of conventional editing or display functions can be performed at the picture processor 180 upon command by the control CPU 122. For example, the still images or the associated video can be enlarged or reduced, pictures can be merged, split or deleted and multiple pictures can be processed for simultaneous display. In addition, the picture processor 180 can facilitate creation of a slide show presentation by the user. It is understood, however, that the invention is not limited in this regard, as many other display and editing functions can be performed by picture processor 180.

Once the image/video/subtitle data is processed, it can propagate through a buffer 182. If the data is to be displayed on an analog display, it can then be decoded by a PAL/NTSC encoder 184. Alternatively, data to be displayed digitally can be fed to an interface 186 which transmits the signal to a digital display.

Multimedia data that is to be displayed on a HDTV is processed in a slightly different way. Referring back to the DEMUX 176, any video, audio or subtitle information that has been combined with a still picture can be separated from the still picture by the DEMUX 176 and transferred to a MUX 190. Similar to the still pictures to be displayed on an analog or digital display, the still pictures can be decoded by the video/image decoder 178 and processed by the picture processor 180. Once any editing or display functions have been performed, the still images can be encoded by an MPEG video encoder 188 and sent to the MUX 190. At the MUX 190, the still images can be recombined with any associated audio, video or subtitle information. The multimedia data can then be sent to a VSB modulator 192 and can be transmitted to an HDTV display.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Media

Figure 2:
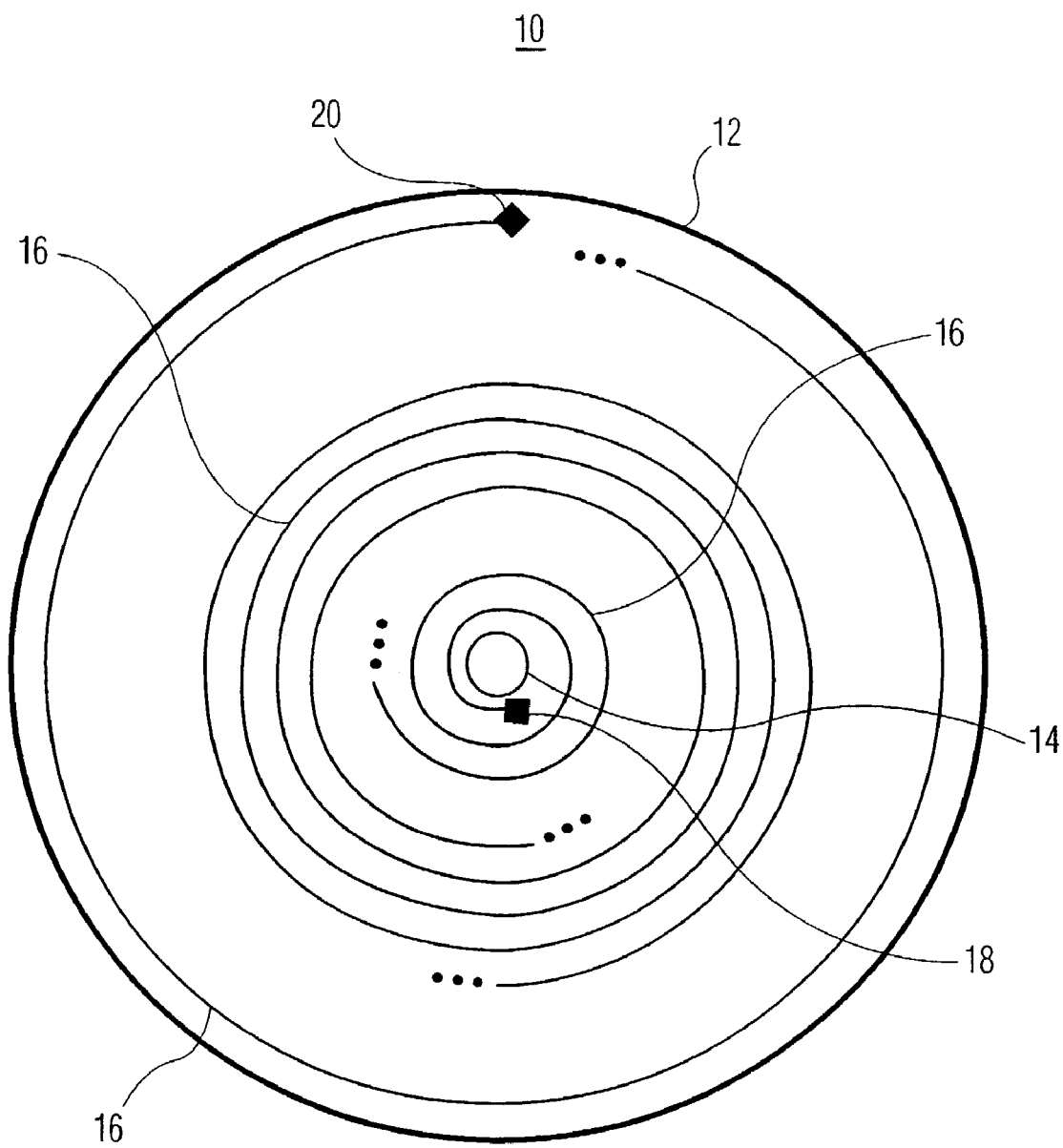
FIG. 2 illustrates the spiral track on a rewritable DVD disc.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12. The re-writable DVD can consist of two substrates bonded together by an adhesive layer forming a 1.2 mm thick disk. A center hole 14 can be formed in the disk so that a gripping device of the motor 106 of FIG. 1 can securely grip the disk and control the angular motion of the same in accordance with the inventive arrangements.

The direction of recording on the track is typically outwardly along a spiral track 16, from a smaller radius part of the spiral to a larger radius part of the spiral. The several series of three large dots (_ _ _) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

Conventional DVD Root Directory and Data Structure

Figure 3A:
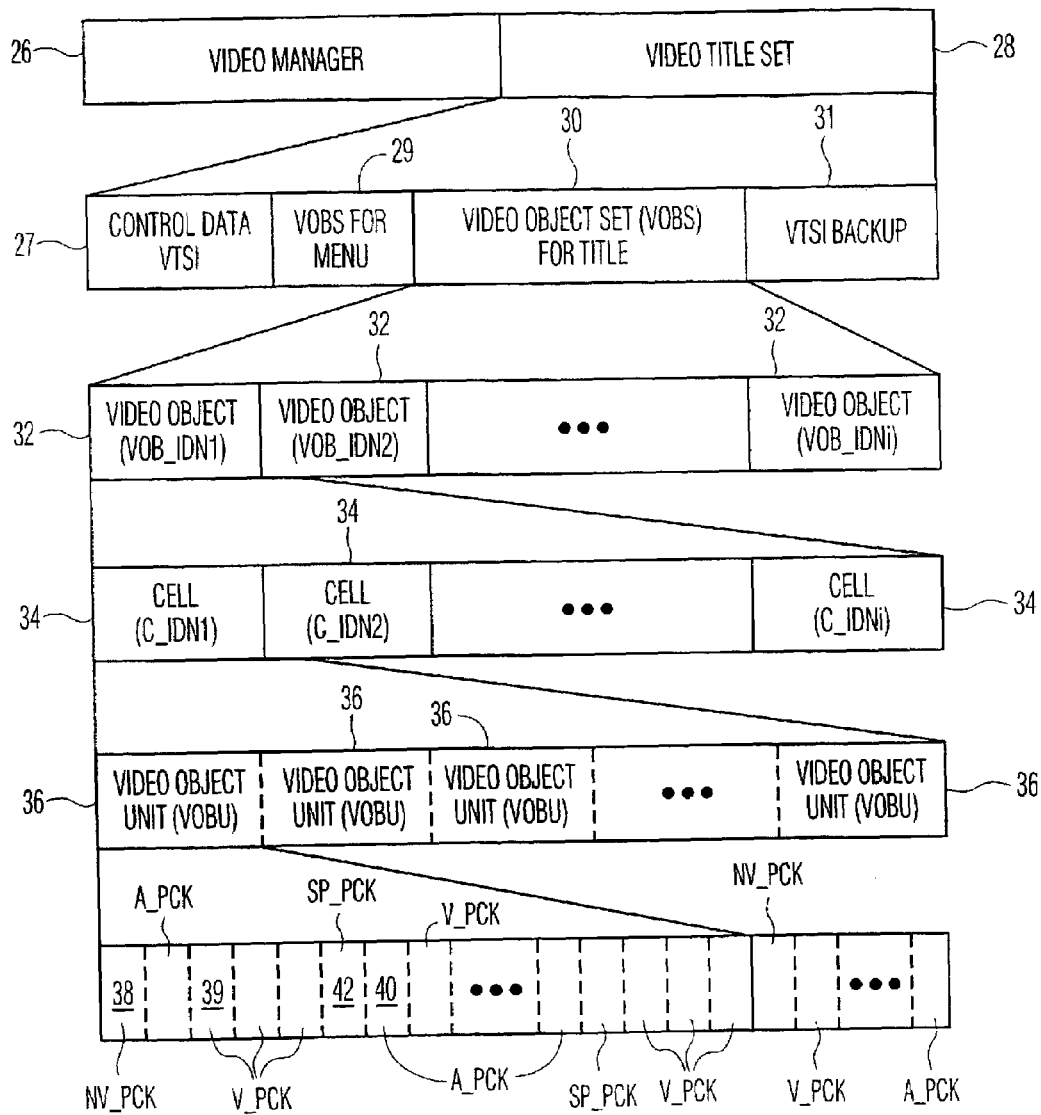
FIG. 3A illustrates a conventional data structure of the rewritable DVD disc of FIG. 2.

FIG. 3A illustrates a conventional DVD data structure. Each DVD contains a video manager 26 and a video title set (VTS) 28. The VTS includes control data video title set information (VTSI) 27, an optional video object set (VOBS) for menu 29, one or more VOBS for title 30 which contain the actual title content, and a VTSI backup 31. Each VOBS 30 is comprised of a plurality of video objects (VOB) 32. Each VOB 32 includes a plurality of cells 34. Each VOBS 30 also includes a collection of pointers to one or more cells 34. In this way, the VOBS 30 data links the cells 34 together and indicates in what order the programs or the cells 34 are to be played. The cells 34 within a particular VOBS 30 are flagged for play in any desired order. For example, they can be played sequentially or randomly. The data layer containing the cells 34 is the lowest user-accessible data layer in the conventional DVD data structure.

Each cell 34 includes a plurality of video object units (VOBU) 36. Each of the VOBU's 36 in which the video content of the disc 102 resides typically contains 0.4 to 1.0 seconds of presentation material. Each VOBU 36 is a sequence of data packs in recording order. Each VOBU starts with exactly one navigation pack (NV_PCK) 38 and could encompass all of the following kinds of packs, including video packs (V_PCK) 39, audio packs (A_PCK) 40 and subtitle or sub-picture packs (SP_PCK) 42. Each VOBU is nominally comprised of one group of pictures (GOP).

Figure 3B:
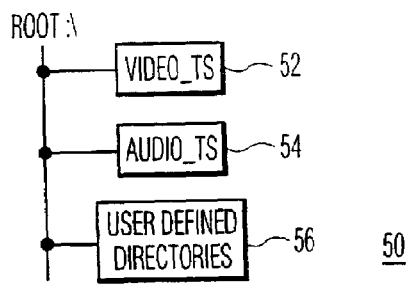
FIG. 3B illustrates a conventional root directory of the rewritable DVD disc of FIG. 2.

FIG. 3B illustrates a conventional DVD root directory 50. As shown in FIG. 3B, each DVD root directory can contain a video title set (Video_TS) directory 52, an audio title set (Audio_TS) directory 54 and other user defined directories 56. Each of these directories can include information regarding the files contained therein. For example, the Video_TS directory 52 can include information concerning the following files: control data VTSI 27; VOBS for menu 29; VOBS for title 30; and VTSI backup 31. This information can contain the file name, file size, when the file was created or modified and the file's start edges. In addition, the Audio_TS 54 can contain similar information for the files contained therein.

DVD Photo Album

The video data representing photographs in a DVD photo album in accordance with the inventive arrangements is advantageously recordable on a rewritable DVD. The data representing photographs can be stored together with supplemental information, such as video, audio and subtitle data. All of this data can be made backward compatible with read-only DVD insofar as playing back is concerned, so that the recorded photo album can be viewed, that is played back, on any regular DVD player.

Figure 4A:
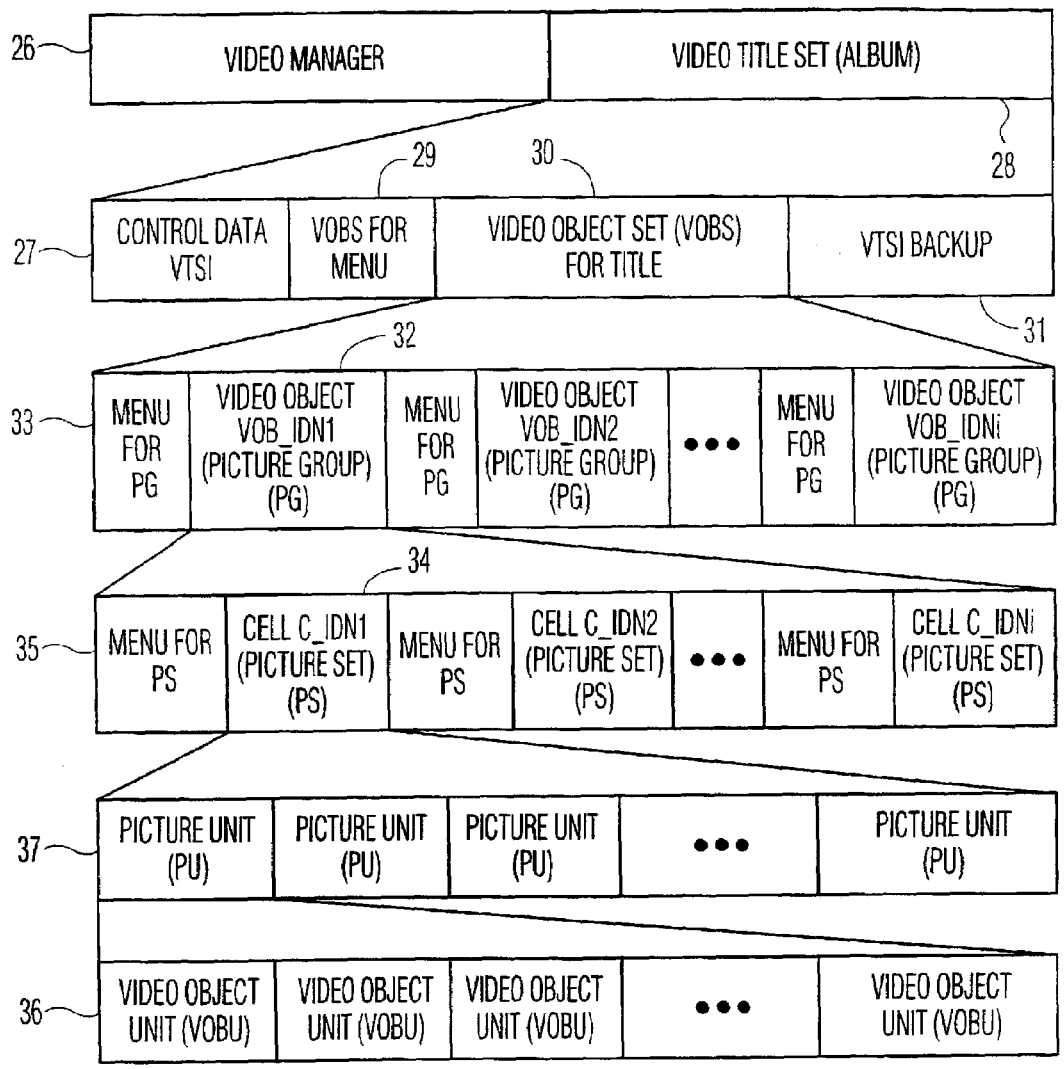
FIG. 4A illustrates a data structure of a rewritable DVD disc capable of storing photo album pictures in accordance with the inventive arrangements.

FIG. 4A illustrates a physical data structure 40 that can be used to store one or more still images that form a photo album. The data structure 40 can contain a video manager 26 and a video title set (VTS) 28. The VTS 28 can contain all of the multimedia data associated with a disc medium photo album and can be alternatively referred to as an album. The VTS 28 can contain a control data video title set information (VTSI) 27, a video object set (VOBS) for menu 29, a VOBS for title 30 which can contain the actual title content and a VTSI backup 31.

Each VOBS 30 can include one or more video objects (VOB) 32. For purposes of the invention, each VOB 32 can be referred to as a picture group (PG). In one arrangement, each VOB 32 can have a menu for PG 33, which can list all the cells 34 that are contained within a particular VOB 32. For purposes of the invention, each cell 34 can be referred to as a picture set (PS). Similar to the VOB's 32, each cell 34 can have a menu for PS 35, which can list all the picture units (PU) 37 contained within a particular cell 34. These PU's 37 can be listed in the menu for PS 35 according to the name created for each particular PU 37 during the writing process as discussed in FIG. 1. As a result, a user is permitted direct access to any PU 37 that is stored on the disc 102 as part of a DVD photo album and is not limited to accessing data at the cell 34 layer.

To accommodate the PU's 37, a separate data layer can be created in the data structure 40. Preferably, each PU 37 contains only one picture. It should be noted, however, that a PU 37 can also contain all of the audio, video or subtitle information that has been combined with a particular picture. To store this multimedia data, each PU 37 can contain one or more VOBU's 36. Similar to conventional VOBU's, each VOBU 36 can contain a navigation pack and, depending on the type of data combined with the still image, one or more audio packs, one or more video packs and one or more subpicture packs. For example, if audio and video have previously been combined with a photo album picture, then the PU 37 that contains that particular picture can include as many VOBU's 36 as necessary to store the associated audio and video.

The navigation pack is similar to a conventional navigation pack; however, the navigation pack contained in a PU 37 can include additional information to facilitate the display of photo album pictures and any associated multimedia data. Specifically, the navigation pack can contain the following eight kinds of information: (1) a PU display time parameter; (2) an audio setting; (3) an audio interrupt setting; (4) a slide show display time parameter; (5) a video setting; (6) a video display parameter; (7) one or more addresses of backward located PU's; and (8) one or more addresses of forward located PU's. It is understood, however, that the navigation pack of a PU 37 is not limited in this regard, as other parameters or settings may be used for displaying the DVD photo album.

The PU display time parameter can set the time allotted for displaying each picture in the photo album. The allotted time can be set from approximately $\frac{1}{16}$ of a second to approximately 3,600 seconds. It should be noted, however, that the invention is not so limited, as other time periods can be used. The audio setting can inform the control CPU 122 of FIG. 1 whether a portion of audio is combined with a particular PU 37. In addition, the audio setting can determine whether the audio contains speech, music or a combination thereof. The audio interrupt setting can inform the CPU 122 to initiate a process of overriding any existing audio currently combined with a PU 37 with a new portion of audio.

The slide show display time parameter can set the time allotted for the display of each PU 37 that can comprise a slide show presentation, if a user chooses to create such a presentation. Preferably, this time period is selected by the user; however, if the user does not select a time, a default setting of approximately five seconds can be used. The video setting can inform the CPU 122 that a particular PU 37 contains a video display. Further, the video display parameter can determine whether the associated video will be displayed under a picture-in-picture format or a full screen display. For purposes of locating other PU's 37, the navigation pack can also contain the addresses of one or more previously created, or backward located, PU's 37. In addition, the navigation pack can also contain the addresses of one or more subsequently created, or forward located, PU's 37.

Although the data structure 40 of FIG. 4A allows access to individual pictures and contains additional information to complement their display, the data structure 40 is backward compatible with conventional DVD players. Thus, the pictures and any associated multimedia data that make up a DVD photo album can be displayed on these devices. Since a conventional DVD player does not recognize the information contained in the menus or the extra data layer for the picture units, the conventional DVD player can ignore the added features of the data structure 40. Significantly, however, a user can still display still images and their related multimedia data contained in the photo album.

Although ignoring these added features enables a user to display photo album pictures on a DVD player, the accessibility of the pictures is somewhat negatively affected. Under this arrangement, a user cannot locate individual PU's 37. This is because the menu for PG 33, the menu for PS 35 and the data layer containing the PU's 37 are ignored. Nevertheless, a user can locate the cell 34 that contains one or more pictures to be displayed by identifying the cell 34 identification number.

Figure 4B:
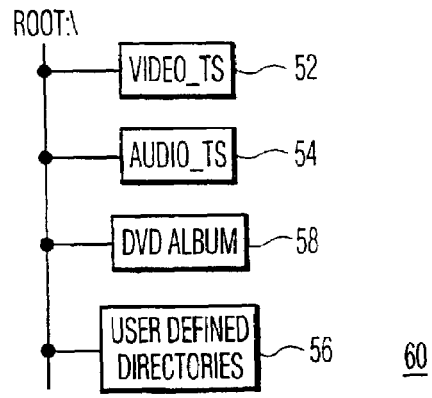
FIG. 4B illustrates a root directory of a rewritable DVD disc in accordance with the inventive arrangements.

FIG. 4B illustrates a root directory 60 that can be used in accordance with the inventive arrangements. As shown in FIG. 4B, a DVD album directory 58 can be added to the root directory 60 for storing relevant information regarding the creation of a DVD photo album. The album directory 58 can include information concerning the following files: each VOB 32, each cell 34 and each PU 37. In addition, this information can include the file name, file size, when the file was created or modified and the file's start edges. Moreover, a conventional DVD player will simply ignore the added album directory 58.

Figure 5:
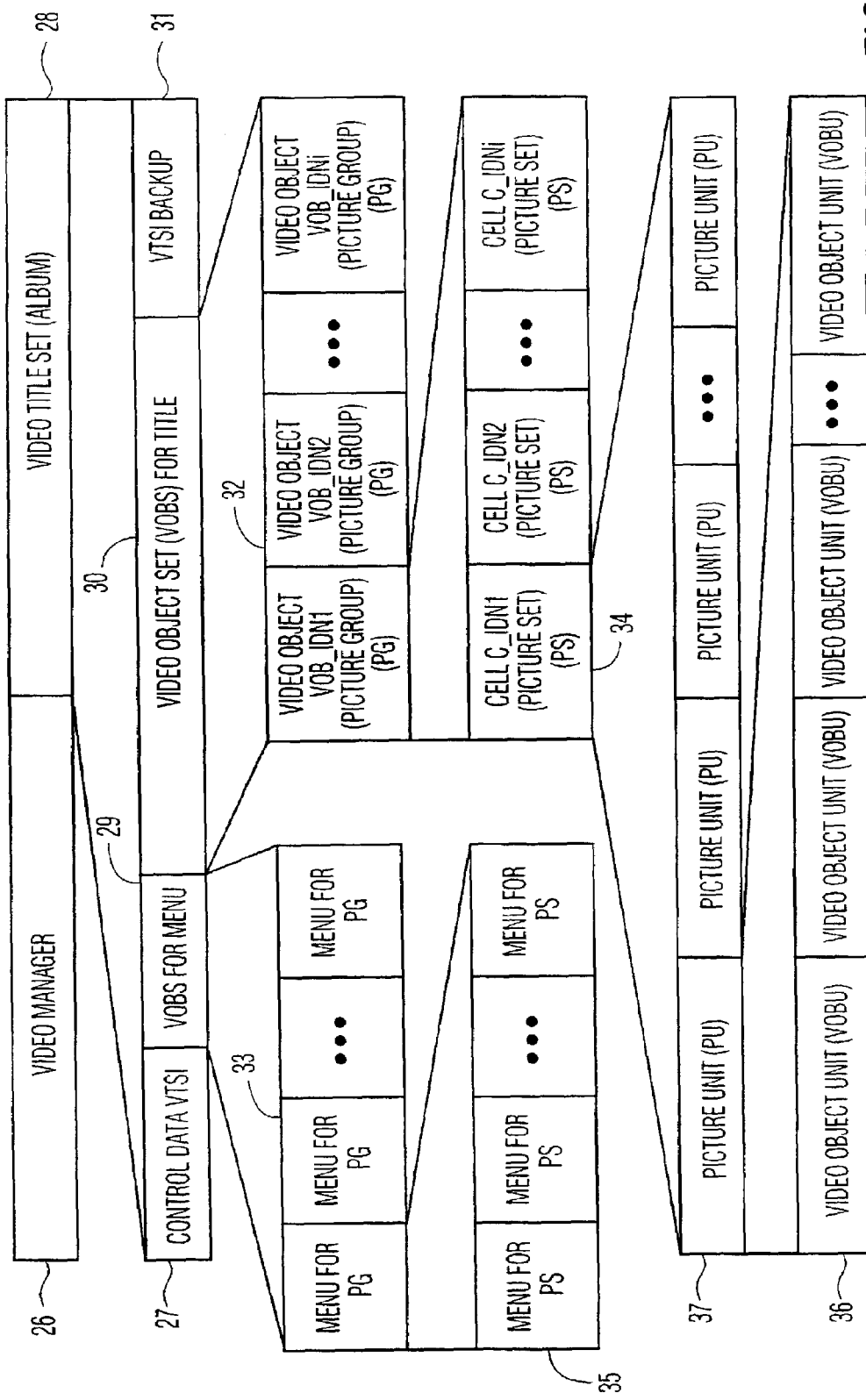
FIG. 5 illustrates an alternative embodiment of the data structure of FIG. 4 in accordance with the inventive arrangements.

FIG. 5 illustrates an alternative arrangement of the data structure 40 of FIG. 4. As shown in the data structure 50, the menus for PG 33 for the VOB's 32 and the menus for PS 35 for the cells 34 can be contained in the VOBS for menu 29. It should be noted, however, that this data structure 50 retains the advantages present in the data structure 40, namely, accessibility to individual pictures, additional display information and backward compatibility. In addition, a conventional DVD player can recognize the menu for PG 33 and the menu for PS 35 since they are contained in the VOBS for menu 29. Although similar to the data structure 40 of FIG. 4 in that individual pictures cannot be directly accessed by the user, the user can access a particular cell 34 through the menu for PS 33. Thus, a user is not required to know the cell 34 identification number. Moreover, a user can access the menu for PS 35 to determine whether a picture is contained within a particular cell 34. This can narrow the search for a certain picture to one cell 34.

Although not shown in any of the drawings, the disc 102 can have a Disc ID setting typically located at the beginning of the disc 102. Generally, this setting is set to "DVD-ROM" to indicate that the data structure being employed is a conventional structure. In one arrangement of the present invention, the Disc ID setting can be set to "Album" to indicate that the data structure on the disc 102 is either the data structure 40 of FIG. 4 or the data structure 50 of FIG. 5. Currently, however, it is preferable to maintain this setting at "DVD-ROM" since a disc 102 with a setting of "Album" cannot be displayed in a conventional DVD player. This may change, however, as the number of DVD players that can accept discs 102 with "Album" Disc ID settings increases.

What is claimed is:

1. A method for providing a disc media photo album having a physical data structure including a video title set, a video object set (VOBS) for title containing at least one video object (VOB) in a VOB data layer, and a plurality of cells in a cell data layer adjacent to said VOB data layer, which disc media is backward compatible with DVD-video format, comprising the steps of;
   providing at least one picture unit (PU) for each said cell, each said PU comprised of at least one video object unit (VOBU) and containing a single photo album picture to be displayed; and
   providing a plurality of menus embedded within each of said VOB and cell data layers of said physical data structure for listing at least each cell within each VOB and each picture unit (PU) within each cell, respectively, and to permit direct user access to individual photo album pictures through said menus.

2. The method according to claim 1, wherein said plurality of menus comprises at least a menu for said at least one video object for selecting at least one said cell within each said VOB.

3. The method according to claim 2, wherein said plurality of menus further comprises a menu for at least one cell for selecting at least one said PU within each said cell.

4. The method according to claim 3, wherein said menu for said at least one video object and menu for said at least one cell is contained within a video object set for menu of said video title set.

5. The method according to claim 3, wherein said menu for said at least one video object is contained within said video object set for title.

6. The method according to claim 5, wherein said menu for said at least one cell is contained within each said VOB containing at least one of said picture units.

7. The method according to claim 1, wherein said PU is further comprised of video data to be displayed with said photo album picture.

8. The method according to claim 1, wherein said PU is further comprised of audio data to be displayed with said photo album picture.

9. The method according to claim 1, wherein said PU is further comprised of subtitle information to be displayed with said photo album picture.

10. The method according to claim 1, wherein a navigation pack for PU is provided in each said VOBU for a photo album picture to be displayed, said navigation pack defining control data for said photo album picture of said PU.

11. The method according to claim 10, wherein said control data comprises a picture display time parameter to control a display duration for said photo album picture.

12. The method according to claim 10, wherein said control data comprises an associated audio sound track enable control to control the playback of an audio sound track for said photo album picture.

13. The method according to claim 10, wherein said control data comprises a slide show display time parameter for controlling a display time for each said photo album picture in a slide show presentation.

14. The method according to claim 10, wherein said control data comprises an associated video enable control for displaying a video presentation in coordination with said photo album picture to be displayed.

15. The method according to claim 10, wherein said control data comprises a video display format control for selecting a format of said video presentation to be displayed in conjunction with said photo album picture.

16. The method according to claim 10, wherein said control data comprises PU address information for locating past and future PU's contained on said disc media.

17. The method according to claim 1 further comprising the step of adding a photo album directory to a root directory in said disc media.

18. A recordable disc medium system for providing a disc media photo album, comprising:
  a disc medium recorder for recording said disc media photo album;
  a disc medium for storing said disc media photo album, said disc medium backward compatible with DVD-video format and having a physical data structure including a video title set, a video object set (VOBS) for title containing at least one video object (VOB) in a VOB data layer and a plurality of cells in a cell data layer adjacent to said VOB data layer;
  at least one picture unit (PU) for each said cell, each said PU having at least one video object unit (VOBU) and containing a single photo album picture to be displayed; and
  a plurality of menus embedded within each of said VOB and cell data layers of said physical data structure for listing at least each cell within each VOB and each picture unit (PU) within each cell, respectively, and to permit direct user access to individual photo album pictures through said menus.

19. The system according to claim 18, wherein said plurality of menus comprises at least a menu for each of said at least one video object for selecting at least one said cell within each said VOB.

20. The system according to claim 19, wherein said plurality of menus further comprises a menu for at least one cell for selecting at least one said PU within each said cell.

21. The system according to claim 20, wherein said menu for each of said at least one video object, and menu for at least one cell is contained within a video object set for menu of said video title set.

22. The system according to claim 20, wherein said menu for each of said at least one video object is contained within said video object set for title.

23. The system according to claim 22, wherein said menu for at least one cell is contained within each said video object containing at least one of said picture units.

24. The system according to claim 18, wherein said PU is further comprised of video data to be displayed with said photo album picture.

25. The system according to claim 18, wherein said PU is further comprised of audio data to be displayed with said photo album picture.

26. The system according to claim 18, wherein said PU is further comprised of subtitle information to be displayed with said photo album picture to be displayed.

27. The system according to claim 18, wherein a navigation pack for PU is provided in each said VOBU for a photo album picture to be displayed, said navigation pack defining control data for said photo album picture of said PU.

28. The system according to claim 27, wherein said control data comprises a picture display time parameter to control a display duration for said photo album picture.

29. The system according to claim 27, wherein said control data comprises an associated audio sound track enable control to control the playback of an audio sound track for said photo album picture.

30. The system according to claim 27, wherein said control data comprises a slide show display time parameter for controlling a display time for each said photo album picture in a slide show presentation.

31. The system according to claim 27, wherein said control data comprises an associated video enable control for displaying a video presentation in coordination with said photo album picture to be displayed.

32. The system according to claim 27, wherein said control data comprises a video display format control for selecting a format of said video presentation to be displayed in conjunction with said photo album picture.

33. The system according to claim 27, wherein said control data comprises PU address information for locating past and future PU's contained on said disc media.

34. The system according to claim 18, further comprising a photo album directory, wherein said photo album directory is added to a root directory of said disc media.

* * * * *